A. H. SQUIER.
VALVE PLUG.
APPLICATION FILED MAY 26, 1917.
1,335,034. Patented Mar. 30, 1920.
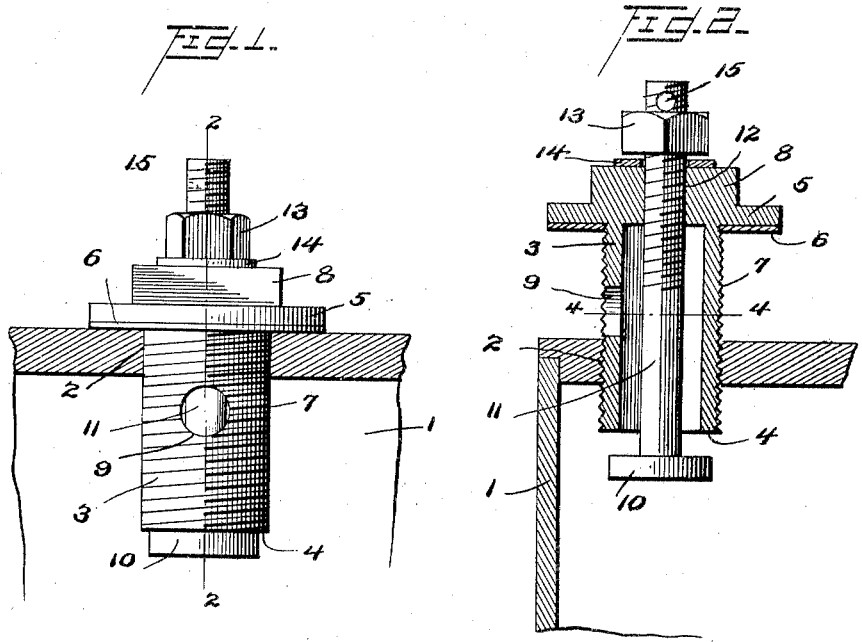
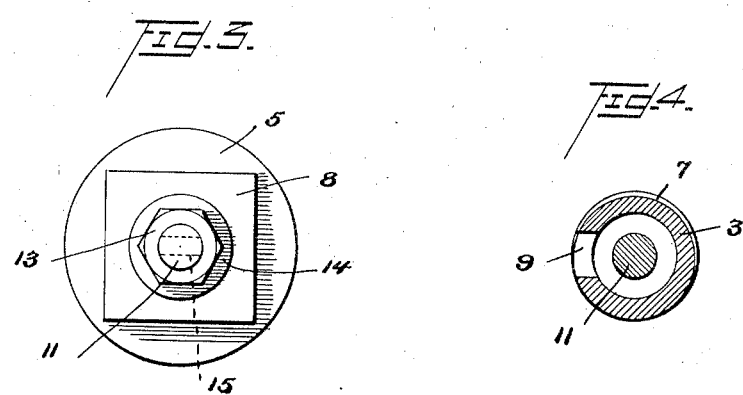
Witness
Harold Stearns
Inventor
Arthur H. Squier
By Samuel W. Foster
his Attorney

UNITED STATES PATENT OFFICE.

ARTHUR H. SQUIER, OF TIONESTA, PENNSYLVANIA.

VALVE-PLUG.

1,335,034.  Specification of Letters Patent.  Patented Mar. 30, 1920.

Application filed May 26, 1917. Serial No. 171,302.

*To all whom it may concern:*

Be it known that I, ARTHUR H. SQUIER, a citizen of the United States, residing at Tionesta, in the county of Forest and State of Pennsylvania, have invented certain new and useful Improvements in Valve-Plugs, of which the following is a specification.

My invention relates to improvements in valve plugs, the object of the invention being to provide a valve plug adapted for use in connection with receptacles for gasolene, which are used for shipping or transporting the gasolene, and which permits the liquid to be removed without waste, even in warm weather.

It is a well known fact that gasolene and similar volatile liquids during shipment, and especially in hot weather, cause an increase of pressure which becomes in some cases very high. When the ordinary valve plug is opened there is an escape of gas and vapor as well as liquid, which cannot be prevented and is a total loss. It is the purpose of my improved valve plug to prevent this waste and allow the liquid to be removed whenever desired, and also comply fully with the requirements of public service commissions and the like.

With these and other objects in view the invention consists in certain novel features of construtcion, and combinations and arrangements of parts, as will be more fully hereinafter described and pointed out.

In the accompanying drawing:

Figure 1 is a view in elevation of my improved valve plug, showing the same in elevation in a drum, the latter being in section.

Fig. 2 is a view in section on the line 2—2 of Fig. 1 valve being shown in open position.

Fig. 3 is an end view of the valve plug, and

Fig. 4 is a view in transverse section on the line 4—4 of Fig. 2.

1 represents a drum or other receptacle having a screw threaded opening 2 receiving my improved valve plug 3.

The valve plug 3 is hollow and of general cylindrical form open at its inner end and made with a valve seat 4, and at its outer end, closed by a head 5. The head 5 is of larger diameter than the main portion of the plug, and a washer or gasket 6, is located around the plug between the head 5 and receptacle 1 to insure a tight closure.

Plug 3 is screw threaded as shown at 7 and fits within the screw threaded hole 2. An angular enlargement 8 on head 5 permits the use of a wrench to turn the plug, and position an opening 9 in the wall of the plug either inside or outside of receptacle 1 as will be understood.

A valve 10 is located at the inner end of plug 3 and engages seat 4. This valve has a screw threaded stem which projects through the screw opening 12 in head 5 and is provided on its outer end with jam nut 13 to hold the valve against any accidental movement.

I preferably provide a washer between nut 13 and the head 5, and stem 11 is provided with an opening 15 to receive a nail or pin to turn the same and move valve 10.

Fig. 1 shows the position of the several parts when the valve is closed. To open the valve it is necessary to turn the plug 3 until the opening 9 is outside of the receptacle 2. The jam nut 13 must then be released and stem 11 turned to force valve 10 away from seat 4 as shown in Fig. 2.

It will be noted that the outlet of liquid from the receptacle can be controlled by the valve 10 even after the plug has been moved to open position, hence there is no loss of the liquid regardless of the pressure. When the plug is closed the receptacle will be as tight as before.

While I have referred to my valve plug as used in connection with gasolene it is to be understood that I do not limit myself to any particular use but consider myself at liberty to use the device for any purpose for which it is adapted and I also would have it understood that I consider myself at liberty to make such changes and alterations as fairly fall within the spirit and scope of the claims.

Having fully described my invention, what I claim as new and desire to secure by Letters Patent is:

1. A valve having an externally screw threaded hollow body closed at the outer end and open at its inner end and having an opening in the side adapted to lie inside or outside of the container with which the valve is used according to the extent to which the body is screwed into the container, a flange about the threaded body, a container within which the valve is adapted to be screwed, leaving the side opening outside of the container for pouring purposes, or inside the container and the flange against the container for sealing purposes, in combination with a closure for the open inner end adapted to engage the inner face of the body about the open inner end, and to extend out through the body at the closed end, and adjusting means for bringing said closure against the inner end of the body.

2. A container, a hollow valve body longitudinally adjustable therein having an open inner end and a closed outer end and a side opening in combination with a sealing flange adapted to engage the container in one position thereof and a valve passing through the closed outer end and sealing against the open inner end of the body.

In testimony whereof I have signed my name to this specification in the presence of two subscribing witnesses.

ARTHUR H. SQUIER.

Witnesses:
G. A. BRANT,
GLADYS BAUMGARDNER.